United States Patent
Akao et al.

(10) Patent No.: US 7,965,353 B2
(45) Date of Patent: Jun. 21, 2011

(54) COLOR FILTER WITH PERPENDICULAR OPTICAL RETARDATION AND LIQUID CRYSTAL DISPLAY DEVICE

(75) Inventors: Sosuke Akao, Tokyo (JP); Koichi Minato, Tokyo (JP); Satoshi Ohkuma, Tokyo (JP); Yoshinori Nagasaki, Tokyo (JP); Takeshi Itoi, Tokyo (JP); Mitsuhisa Hatashima, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 681 days.

(21) Appl. No.: 12/002,760

(22) Filed: Dec. 19, 2007

(65) Prior Publication Data
US 2008/0143935 A1 Jun. 19, 2008

(30) Foreign Application Priority Data
Dec. 19, 2006 (JP) ................. 2006-341841

(51) Int. Cl.
*G02F 1/1335* (2006.01)
*G09G 3/38* (2006.01)
(52) U.S. Cl. .......................... 349/106; 345/88
(58) Field of Classification Search .............. 349/106, 349/117–118; 345/88
See application file for complete search history.

(56) References Cited

U.S. PATENT DOCUMENTS

| | | | |
|---|---|---|---|
| 6,013,415 A * | 1/2000 | Sakurai et al. | 430/281.1 |
| 6,200,446 B1 * | 3/2001 | Inoue et al. | 204/486 |
| 6,436,591 B1 * | 8/2002 | Ohtsu et al. | 430/7 |
| 7,646,457 B2 * | 1/2010 | Fukagawa et al. | 349/122 |
| 2004/0263723 A1 * | 12/2004 | Moon et al. | 349/106 |
| 2005/0195348 A1 * | 9/2005 | Saitoh et al. | 349/118 |
| 2007/0252927 A1 * | 11/2007 | Ichihashi et al. | 349/106 |
| 2007/0258032 A1 * | 11/2007 | Kaihoko et al. | 349/141 |
| 2008/0111459 A1 * | 5/2008 | Helber et al. | 313/112 |
| 2009/0096966 A1 * | 4/2009 | Umemoto et al. | 349/106 |

FOREIGN PATENT DOCUMENTS

| | | | |
|---|---|---|---|
| JP | 05254256 A * | 5/1993 | |
| JP | 10-153802 | 6/1998 | |
| JP | 2000-136253 | 5/2000 | |
| JP | 2005-148118 | 6/2005 | |
| JP | 2006307149 A * | 11/2006 | |
| WO | WO 2007091477 A1 * | 8/2007 | |

* cited by examiner

*Primary Examiner* — Hoan C Nguyen
(74) *Attorney, Agent, or Firm* — Staas & Halsey LLP (57) ABSTRACT

A color filter comprising a substrate, a red pixel, green pixel and blue pixel, each being disposed on the substrate, wherein a perpendicular optical retardation $R_{Rth}$ of the red pixel, a perpendicular optical retardation $G_{Rth}$ of the green pixel, and a perpendicular optical retardation $B_{Rth}$ of the blue pixel satisfy the following formulas (1) and (2):

$$|(R_{Rth}-B_{Rth})|-|(G_{Rth}-B_{Rth})| \geqq 0 \quad (1)$$

$$|(R_{Rth}-B_{Rth})|-|(R_{Rth}-G_{Rth})| \geqq 0 \quad (2)$$

wherein $R_{Rth}$, $G_{Rth}$ and $B_{Rth}$ represent, respectively, a product of a thickness [nm] of a pixel and a value obtained by subtracting a value of thickness-wise refractive index from an average value of an in-plane refractive index of each of these pixels.

22 Claims, 2 Drawing Sheets

COLOR FILTER WITH PERPENDICULAR OPTICAL RETARDATION AND LIQUID CRYSTAL DISPLAY DEVICE

CROSS-REFERENCE TO RELATED APPLICATIONS

This application is based upon and claims the benefit of priority from prior Japanese Patent Application No. 2006-341841, filed Dec. 19, 2006, the entire contents of which are incorporated herein by reference.

BACKGROUND OF THE INVENTION

1. Field of the Invention

This invention relates to a color filter to be employed in a liquid crystal device, a solid-state image pickup device, etc., and to a liquid crystal display device which is provided with such a color filter.

2. Description of the Related Art

Recently, because of thinness in wall thickness and the resultant advantages such as space-saving, lightweight properties, power-saving, etc., a liquid crystal display device is now rapidly propagated especially as a display device for television. In order to make the liquid crystal display device applicable to television, it is required to further enhance various properties such as the brightness, contrast and omnidirectional visibility, so that the display device is now frequently constructed such that an optical retardation control layer is employed in combination with a linear deflecting plate.

In recent years in particular, in the case of a vertical orientation mode liquid crystal display which is capable of exhibiting a display of high contrast, there has been employed an optical retardation film (or negative C plate) exhibiting negative birefringence anisotropy and having the optical axis perpendicular to the substrate together with an optical retardation film (or positive A plate) exhibiting positive birefringence anisotropy and having the optical axis horizontal to the substrate (for example, see JP-A 10-153802).

As for specific examples of these optical retardation films, there have been generally employed those that can be obtained by stretching an polycarbonate film or that can be obtained by coating a liquid crystal material exhibiting birefringence anisotropy on the surface of triacetyl cellulose film, etc.

However, in the case of the aforementioned optical retardation films, since the magnitude of retardation thereof is uniformly retained in-plane and hence the magnitude of retardation is not optimally set for each of pixels to be actually displaced, it cannot necessarily be said that the optical retardation compensation is optimally executed by the optical retardation films.

One of the reasons is that since the optical retardation and refractive index of liquid crystal themselves are dependent on the wavelength of transmitting light, the magnitude of retardation demanded for the optical retardation film may differ depending on the color of each pixel constituting the color filter (actually, on the wavelength of transmitting light). In view of this, for example, JP-A 2005-148118 discloses the following proposal. Namely, according to this document, the retardation is controlled depending on the wavelength of transmitting light, thereby making it possible to optimize the compensation of optical retardation.

Another reason is that when each of color pixels constituting the color filter has in itself a perpendicular (thickness-wise) optical retardation, optical retardation is generated in transmitting light, so that the viewing-angle dependence of liquid crystal display device becomes larger, thereby deteriorating the display characteristics thereof. In view of this, for example, JP-A 2000-136253 discloses the following proposal. Namely, according to this document, a colored polymer thin film is constructed so as to contain a macromolecule having a planar structure group on its side chain or so as to contain birefringent-reducing particles having a birefringence index which is opposite in sign (positive or negative) to the macromolecule, thereby trying to reduce the magnitude of retardation which the color filter has.

As a matter of fact however, in spite of these proposals, there is a problem that when black color in normally-black operation to which viewing-angle compensation has been applied is observed obliquely, the black color appears colored into reddish purple due to the light leakage of red and blue.

As a result of studies made by the present inventors on this problem, it has been found out that the perpendicular optical retardation of each of red, green and blue pixels constituting the color filter differs from each other. For example, it has been found out that, in the case of the color filter to be manufactured by making use of a pigment dispersion type color composition, a green pixel exhibits a large magnitude of negative retardation as compared with red and blue pixels. Since the magnitude of retardation of color filter is relatively small as compared with that of other components to be employed in a liquid crystal display device, the aforementioned problem was not considered seriously to date. However, since the optical design is now generally performed centering around green, if the magnitude of retardation of green pixel differs greatly from that of red and blue pixels, light leakage is generated, thus raising problems with respect to the viewing-angle visibility of the display device.

BRIEF SUMMARY OF THE INVENTION

An object of the present invention is to provide a color filter wherein the perpendicular optical retardation of each of red, green and blue pixels constituting the color filter is optimally controlled.

Another object of the present invention is to provide a liquid crystal display device which is constituted by a combination consisting of the aforementioned color filter, an optical retardation film and other constituent members, and is free from coloring development even if it is observed obliquely and excellent in visibility.

According to a first aspect of the present invention, there is provided a color filter comprising a substrate, a red pixel, green pixel and blue pixel, each being disposed on the substrate, wherein a perpendicular optical retardation $R_{Rth}$ of the red pixel, a perpendicular optical retardation $G_{Rth}$ of the green pixel, and a perpendicular optical retardation $B_{Rth}$ of the blue pixel satisfy the following formulas (1) and (2):

$$|(R_{Rth}-B_{Rth})|-|(G_{Rth}-B_{Rth})| \geqq 0 \quad (1)$$

$$|(R_{Rth}-B_{Rth})|-|(R_{Rth}-G_{Rth})| \geqq 0 \quad (2)$$

wherein $R_{Rth}$, $G_{Rth}$ and $B_{Rth}$ represent, respectively, a product of a thickness [nm] of a pixel and a value obtained by subtracting a value of thickness-wise refractive index from an average value of an in-plane refractive index of each of these pixels.

According to a second aspect of the present invention, there is provided a liquid crystal display device which is equipped with the aforementioned color filter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Next, the specific embodiments of the present invention will be explained with reference to drawings.

Figure 1:
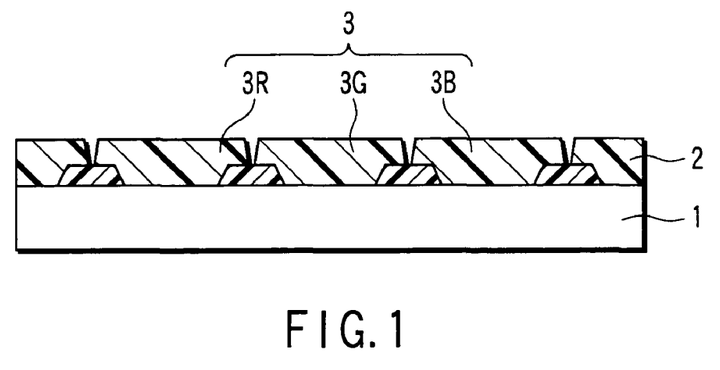
FIG. 1 is a cross-sectional view schematically illustrating a color filter according to a first embodiment of the present invention.

FIG. 1 shows a color filter according to a first embodiment of the present invention. As shown in FIG. 1, the color filter comprises a glass substrate 1, on which a black matrix 2 acting as a light shield layer, and color pixels 3 are arranged. The color pixels 3 are constituted by a red pixel 3R, a green pixel 3G and a blue pixel 3B.

The perpendicular optical retardation Rth of each of these color pixels, i.e., a perpendicular optical retardation $R_{Rth}$ of the red pixel, a perpendicular optical retardation $G_{Rth}$ of the green pixel, and a perpendicular optical retardation $B_{Rth}$ of the blue pixel are controlled to satisfy the following formulas (1) and (2):

$$|(R_{Rth}-B_{Rth})|-|(G_{Rth}-B_{Rth})| \geqq 0 \quad (1)$$

$$|(R_{Rth}-B_{Rth})|-|(R_{Rth}-G_{Rth})| \geqq 0 \quad (2)$$

wherein $R_{Rth}$, $G_{Rth}$ and $B_{Rth}$ represent, respectively, a product of a thickness [nm] of a pixel and a value obtained by subtracting a value of thickness-wise refractive index from an average value of an in-plane refractive index of each of these pixel.

Further, the values of $R_{Rth}$, $G_{Rth}$ and $B_{Rth}$ can be calculated from an average value of the in-plane refractive index of pixels [(nx+ny)/2] that can be obtained through the measurement by means of a three-dimensional refractive index-measuring instrument such as a spectroscopic ellipsometer and from the thickness-wise refractive index [nz], wherein nx, ny and nz represent respectively the refractive indexes along the X-, Y-and Z-axes, respectively. In this case, the X-axis is the axis (axis of retarded phase) indicating a maximum refractive index in the in-plane of the color filter; the Y-axis is the axis perpendicular to the X-axis in the in-plane of the color filter; and the Z-axis is the axis perpendicular to both the X- and Y-axes.

Formulas (1) and (2), above, indicate that, irrespective of the sign, i.e., positive or negative, if $G_{Rth}$ is not smaller than $R_{Rth}$, $B_{Rth}$ is not smaller than $G_{Rth}$, if $G_{Rth}$ is not larger than $R_{Rth}$, $B_{Rth}$ is not larger than $G_{Rth}$. Namely, $G_{Rth}$ exists between $R_{Rth}$ and $B_{Rth}$.

The absolute value of the birefringence index of color filter may desirably be not larger than 0.01. In other words, the perpendicular optical retardation Rth may desirably be as close to $R_{Rth}=G_{Rth}=B_{Rth}=0$ as possible. However, if the birefringence index of color filter is considered in combination with the wavelength dispersibility of the optical retardation of other constituent members such, for example, as liquid crystal, polarizer, alignment layer, etc., other than the color filter, an optimal value of perpendicular optical retardation for the color filter may exist other than the situation where $R_{Rth}=G_{Rth}=B_{Rth}=0$.

The determination of which value is most desirable for the optical retardation Rth of each of color pixels in the color filter may differ depending on the combination thereof with other constituent members. What is important is the fact that in the situation where $B_{Rth}$ is not larger than $G_{Rth}$, even though $G_{Rth}$ is not smaller than $R_{Rth}$, or in the situation where $B_{Rth}$ is not smaller than $G_{Rth}$, even though $G_{Rth}$ is not larger than $R_{Rth}$, it is impossible to realize excellent oblique visibility. The reason for this can be attributed to the fact that in the case of other kinds of constituent members to be employed in a liquid crystal display device, the wavelength dispersibility of birefringence varies continuously relative to the wavelength of transmitting light.

By making use of the color filter where the perpendicular optical retardation Rth of each of the color pixels satisfy the aforementioned conditions, it is possible to obtain a liquid crystal display device which is free from coloring even if it is observed obliquely and excellent in oblique visibility.

Incidentally, in order to realize excellent axial visibility, especially in order to realize a tight color in black color display in the case of the color filter where the color pixel is manufactured by making use of a pigment dispersion type coloring composition, a particle diameter d50 (i.e., corresponding to a particle diameter of 50% in integrated quantity in the cumulative curve of number particle size distribution) in the particle size distribution of the primary particle of the pigment may preferably be confined to 40 nm or less, more preferably 30 nm or less.

For the manufacture of the red pixel, it is possible to employ red pigments such as C.I. Pigment Red 7, 14, 41, 48:2, 48:3, 48:4, 81:1, 81:2, 81:3, 81:4, 146, 168, 177, 178, 184, 185, 187, 200, 202, 208, 210, 246, 254, 255, 264, 270, 272, 279, etc.

Incidentally, this red pigment may be employed together with a yellow pigment. As for yellow pigments, it is possible to employ C.I. Pigment Yellow 1, 2, 3, 4, 5, 6, 10, 12, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 125, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 199, 213, 214, etc.

When the red pixel contains at least one pigment selected from diketopyrrolopyrrol-based red pigment and anthraquinone-based red pigment out of the aforementioned pigments, it would become easy to obtain a desired value for the $R_{Rth}$ and hence the employment of these red pigments is preferable. More specifically, by thinking out the pulverizing treatment of diketopyrrolopyrrol-based red pigment, the $R_{Rth}$ thereof can be made positive or negative as desired and the absolute value thereof can be controlled more or less, while in the case of the anthraquinone-based red pigment, a value of $R_{Rth}$ which is close to zero can be easily obtained irrespective of the pulverizing treatment thereof.

In viewpoints of the hue, lightness and film thickness of a pixel, the red pixel may preferably contain 0-100% by weight of diketopyrrolopyrrol-based red pigment and 0-66% by weight of the anthraquinone-based red pigment both based on a total weight of the pigments. More preferably, the red pixel may contain 0-90% by weight of diketopyrrolopyrrol-based red pigment and 10-60% by weight of the anthraquinone-based red pigment both based on a total weight of the pigments.

In viewpoints of the light resistance, heat resistance, transparence and tinting strength of the pixel, it is preferable to employ C.I. Pigment Red 254 as the diketopyrrolopyrrol-based red pigment and C.I. Pigment Red 177 as the anthraquinone-based red pigment.

As for the green pixel, it is possible to employ green pigments such as C.I. Pigment Green 7, 10, 36, 37, etc. This green composition may be employed together with a yellow pigment. As for the yellow pigment, it is possible to employ the same kinds of yellow pigments as employed in the aforementioned red pixel.

When the green pixel contains at least one pigment selected from metallophthalocyanine halide-based green pigment, azo-based yellow pigment and quinophthalone-based yellow pigment out of the aforementioned pigments, it would become easy to obtain a desired value for the $R_{Rth}$ and hence the employment of these pigments is preferable. Because, it is possible, with the employment of the metallophthalocyanine halide-based green pigment, to control the $G_{Rth}$ to a certain degree by suitably selecting the central metal, while in the case of the azo-based yellow pigment, it is possible to obtain positive $G_{Rth}$ irrespective of the pulverizing treatment thereof, and in the case of the quinophthalone-based yellow pigment, it is possible to obtain negative $G_{Rth}$ irrespective of the pulverizing treatment thereof.

In viewpoints of the hue, lightness and film thickness of a pixel, the green pixel may preferably contain 0-100% by weight of metallophthalocyanine halide-based green pigment and 0-60% by weight of the azo-based yellow pigment and/or quinophthalone-based yellow pigment all based on a total weight of the pigments. More preferably, the green pixel may contain 50-95% by weight of metallophthalocyanine halide-based green pigment and 5-45% by weight of the azo-based yellow pigment and/or quinophthalone-based yellow pigment based on a total weight of the pigments.

In viewpoints of the light resistance, heat resistance, transparence and tinting strength of the pixel, it is preferable to employ C.I. Pigment Green 36 as the metallophthalocyanine halide-based green pigment, C.I. Pigment Yellow 150 as the azo-based yellow pigment and C.I. Pigment Yellow 138 as the quinophthalone-based yellow pigment.

As for the blue pixel, it is possible to employ blue pigments such as C.I. Pigment Blue 15, 15:1, 15:2, 15:3, 15:4, 15:6, 16, 22, 60, 64, etc. Further, these blue pigments may be used together with a violet pigment, specific examples of the violet pigment including C.I. Pigment Violet 1, 19, 23, 27, 29, 30, 32, 37, 40, 42, 50, etc.

When the blue pixel contains at least one pigment selected from metallophthalocyanine-based blue pigment and dioxazine-based violet pigment out of the aforementioned pigments, it is possible to obtain a value of $R_{Rth}$ which is close to zero.

In viewpoints of the hue, lightness and film thickness of a pixel, the blue pixel may preferably contain 0-100% by weight of metallophthalocyanine-based blue pigment and 0-50% by weight of the dioxazine-based violet pigment all based on a total weight of the pigments. More preferably, the blue pixel may contain 0-98% by weight of metallophthalocyanine-based blue pigment and 0-25% by weight of the dioxazine-based violet pigment based on a total weight of the pigments.

In viewpoints of the light resistance, heat resistance, transparence and tinting strength of the pixel, it is preferable to employ C.I. Pigment Blue as the metallophthalocyanine-based blue pigment and C.I. Pigment Violet 23 as the dioxazine-based violet pigment.

Each of the color pixels may contain an inorganic pigment. As for the inorganic pigment useful in this case, it is possible to employ metal oxide powder, metal sulfide powder, metal powder such as yellow lead, zinc chrome, red iron oxide (III), cadmium red, ultramarine blue, Prussian blue, chromium oxide green, cobalt green, etc. Further, in order to secure excellent coating properties, sensitivity, developing properties while making it possible to retain balance between the chroma and lightness, these inorganic pigments may be used in combination with organic pigments.

For the purpose of toning, each of the color pixels may further contain dyes within the limits which do not deteriorate the heat resistance of the pixels.

In order to realize enhanced brightness and enhanced contrast of the color filter, the pigments to be contained in each of the color pixels may preferably be selected from those which have undergone pulverization treatment or those whose primary particle diameter d50 is relatively small.

The primary particle diameter d50 of pigment can be determined using a standard method which includes calculating by taking the picture of the pigment by making use of a transmission electron microscope and directly measuring a size of the primary particles by the image analysis of the picture. More concretely, the primary particle diameter is determined by measuring the major axis and minor axis of the primary particles of each pigment, and averaging these values. The primary particle diameter d50 herein represents a particle diameter (a diameter of equivalent circle) which corresponds to a particle diameter as measured where an integrated quantity in the cumulative curve of number particle size distribution is 50% of the total quantity. Even if either a transmission electron microscope (TEM) or scanning electron microscope (SEM) is employed, the same results are obtained.

The primary particle diameter d50 of pigment may preferably be confined to not larger than 40 nm, more preferably not larger than 30 nm, most preferably not larger than 20 nm. Further, the d50 may preferably be not smaller than 5 nm.

If the primary particle diameter d50 of pigment is larger than 40 nm, the axial visibility of a liquid crystal display device in dark state of black mode would be deteriorated. On the other hand, if the primary particle diameter d50 of pigment is smaller than 5 nm, it may become difficult to realize satisfactory pigment dispersion, thereby making it difficult to keep the stability of the color composition to be used for the creation of color pixel and to secure the fluidity of the color composition. As a result, the luminance and color characteristics of color filter tend to deteriorate.

As for the means for controlling the primary particle diameter d50 and birefringence index of pigment, it is possible to employ a method of mechanically pulverizing the pigment (grinding method), thereby controlling the primary particle diameter d50 and the configuration of particle; a method of precipitating pigments having a desired primary particle diameter d50 and a desired particle configuration (precipitating method) by introducing a solution where a pigment is dissolved in a good solvent into a poor solvent; and a method of manufacturing pigments having a desired primary particle diameter d50 and a desired particle configuration (synthesizing precipitation method) on the occasion of synthesizing the pigment. Depending on the pigment to be used or on the chemical characteristics, any suitable method can be selected for a specific kind of pigment.

Next, there will be explained specifically these methods. As for the method for controlling the primary particle diameter d50 and the particle configuration of the pigments to be contained in a color composition to be used for the creation of the color pixels according to the present invention, any one of the aforementioned methods can be employed.

The grinding method is featured in that by making use of a ball mill, a sand mill or a kneader, a pigment is mechanically kneaded (hereinafter referred to as salt milling) together with a grinding agent such as a water-soluble inorganic salt such as salt and with a water-soluble organic solvent which does not dissolve the grinding agent, after which the inorganic salt and the organic solvent are removed through water washing and dried to obtain a pigment having a desired particle diameter d50 and a desired particle configuration. However, since there are possibilities that the crystal growth is caused to occur in the pigment due to salt milling treatment, it would be effective to incorporate solid resin which can be partially dissolved by the aforementioned organic solvent and a pigment-dispersing agent on the occasion of salt milling treatment to thereby prevent the crystal growth.

With respect to the mixing ratio between the pigment and the inorganic salt, when the ratio of the inorganic salt becomes larger, the refining efficiency of the pigment can be enhanced but the throughput of pigment is caused to decrease, thereby deteriorating the productivity. Because of this reason, it is generally preferable to confine the mixing ratio of the inorganic salt to 1-30 parts by weight, more preferably 2-20 parts by weight per one part by weight of the pigment. On the other hand, the water-soluble organic solvent is employed herein so as to make the pigment and the inorganic salt into a uniform agglomerate, so that the water-soluble organic solvent can be employed at a mixing ratio of 0.5-30 parts by weight per one part by weight of the pigment, though it may depend on the mixing ratio between the pigment and the inorganic salt.

More specifically, the grinding method is performed as follows. Namely, a little amount of a water-soluble organic solvent is added as a wetting agent to a mixture comprising a pigment and a water-soluble inorganic salt and then vigorously kneaded by making use of a kneader, etc. The resultant mixture is introduced into water and stirred by making use of a high-speed mixer to obtain a slurry matter. This slurry matter is then subjected to filtration, water washing and drying to obtain granular pigment having a desired primary particle diameter d50 and configuration.

The precipitating method is a method wherein a pigment is dissolved in a suitable kind of good solvent and then mixed with a poor solvent, thereby precipitating pigments having a desired primary particle diameter and a desired particle configuration. According to this precipitating method, it is possible to control the size of primary particle diameter and the particle configuration by suitably selecting the kind and quantity of these solvents, the precipitation temperature, the precipitating rate, etc. Since pigment cannot be easily dissolved in a solvent in general, the solvent that can be employed is limited. Specific examples of the known solvent that can be employed herein are, for example, strongly acidic solvents such as concentrated sulfuric acid, polyphosphoric acid, chlorosulfonic acid; and basic solvents such as liquid ammonia, dimethyl formamide solution of sodium methylate, etc.

As a typical example of this precipitating method, there is known an acid pasting method wherein a pigment is dissolved in an acidic solvent to obtain a solution, which is then introduced into another solvent to thereby re-precipitate fine particles, thus obtaining a pigment having desired features. In this case, in viewpoint of manufacturing cost, a method of pouring a sulfuric acid solution into water is generally employed in industries. Although there are not any particular limitations with respect to the concentration of the sulfuric acid, it is generally preferable to confine it to the range of 95 to 100% by weight. Although there are not any particular limitations with respect to the mixing ratio of the sulfuric acid to the pigment, if the mixing ratio is too small, the viscosity of the resultant solution would become too high, thus making it difficult to easily handle the solution. On the contrary, if the mixing ratio is too large, the treatment efficiency of the pigment would be deteriorated. Therefore, the mixing ratio of sulfuric acid to the pigment may preferably be confined to the range of 3-10 times (weight) the weight of the pigment.

Incidentally, the pigment is not necessarily required to be completely dissolved in a solvent. The temperature on the occasion of dissolution may preferably be confined to the range of 0-50° C. If the temperature on this occasion is lower than 0° C., the sulfuric acid may be frozen and, additionally, the solubility of the pigment would be decreased. On the other hand, if the temperature on this occasion is higher than 50° C., a side reaction may more likely be caused to occur. The temperature of water to be poured may preferably be confined to the range of 1-60° C. If the temperature of water on this occasion is higher than 60° C., water may be boiled up by the heat of dissolution on the occasion of pouring water to the sulfuric acid, thus making the work very dangerous. On the other hand, if the temperature of water on this occasion is lower than 1° C., the water may be frozen. The time for the pouring of water may preferably be confined to 0.1 to 30 minutes based on one weight part of the pigment. As the pouring time is prolonged, the primary particle diameter d50 tends to become larger.

The control of the primary particle diameter d50 and the particle configuration of pigment may be performed by a combination of methods consisting of the precipitating method such as the acid pasting method and the grinding method such as the salt milling method. This combination method is more preferable in the respects that it can be performed while taking the degree of grinding into consideration and that the fluidity of the dispersed body can be suitably secured.

In order to prevent the flocculation of the pigment in the course of controlling the primary particle diameter d50 and the particle configuration of pigment during the salt milling or the acid pasting, a dispersing agent such as a pigment derivative, a resin type pigment dispersing agent, a surfactant as shown below can be additionally employed. Further, when the controlling of the primary particle diameter d50 and the particle configuration of pigment is performed in the presence of two or more kinds of pigments, it would become possible to obtain a stable dispersed body of pigments even if the pigments are inherently difficult to disperse if they are treated individually.

There is known a leuco method as a special precipitation method. When a vat dye type pigment such as flavanthrone pigment, perinone pigment, perylene pigment, indanthrone pigment, etc., is reduced by making use of alkaline hydrosulfite, the quinine group thereof is turned into the sodium salt of hydroquinone (leuco compound), thus making it water-soluble. When a suitable oxidizing agent is added to this aqueous solution to oxidize the pigment, a pigment which is insoluble to water and small in primary particle diameter can be precipitated.

The synthesizing precipitation method is a method for precipitating a pigment having a desired primary particle diameter d50 and a desired particle configuration concurrent with the synthesis of the pigment. Since the filtration which is a typical separation method is difficult to perform unless pigment particles are flocculated into larger secondary particles on the occasion of taking up the refined pigment products from a solvent, this synthesizing precipitation method is generally applied to a pigment such as azo type pigments that can be synthesized in an aqueous system where secondary flocculation can easily take place.

Further, as for the means for controlling the primary particle diameter d50 and the particle configuration of the pigments, it is also possible to employ a method wherein a pigment is dispersed for a long period of time by making use of a high-speed sand mill (so-called dry milling method for dry-milling a pigment), thereby making it possible to minimize the primary particle diameter of pigment concurrent with the dispersion of pigment.

The pigment carrier to be contained in the color composition to be employed for forming the color pixels of color filter according to one embodiment of the present invention is employed for dispersing the pigment and is formed of a transparent resin, precursors thereof or a mixture thereof. The transparent resin to be employed herein may preferably have a permeability of not less than 80%, more preferably not less than 95% in a total wavelength range of 400-700 nm of visible light zone. As for specific examples of the transparent resin, it is possible to employ thermoplastic resin, thermosetting resin and photosensitive resin. The precursor may be a monomer or an oligomer which is capable of creating a transparent resin through the curing thereof by the irradiation of radiation. These resins and precursor can be employed singly or in combination of two or more kinds thereof.

The pigment carrier can be employed at a ratio ranging from 30 to 700 parts by weight, more preferably 60 to 450 parts by weight based on 100 parts by weight of the pigments in the color composition. In a case where a mixture consisting of a transparent resin and the precursor thereof are to be employed as a pigment carrier, the transparent resin can be employed at a ratio ranging from 20 to 400 parts by weight, more preferably 50 to 250 parts by weight based on 100 parts by weight of the pigments in the color composition. Further, the precursor of transparent resin can be employed at a ratio ranging from 10 to 300 parts by weight, more preferably 10 to 200 parts by weight based on 100 parts by weight of the pigments in the color composition.

As for the thermoplastic resin, it is possible to employ, for example, butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene, polyamide resin, rubber type resin, cyclized rubber-based resin, celluloses, polybutadien, polyethylene, polypropylene, polyimide, etc.

As for the thermosetting resin, it is possible to employ, for example, epoxy resin, benzoguanamine resin, rosin-modified maleic resin, rosin-modified fumaric acid resin, melamine resin, urea resin, phenol resin, etc.

As for the photosensitive resin, it is possible to employ resins having a linear macromolecule into which a photo-curable group such as (metha)acryloyl group, styryl group, etc., has been introduced through a reaction between a linear macromolecule having a reactive substituent group such as hydroxyl group, carboxyl group, amino group, etc., and a (metha)acrylic compound having a reactive substituent group such as isocyanate group, aldehyde group, epoxy group, etc., or cinnamic acid. It is also possible to employ a linear macromolecule containing an acid anhydride such as styrene-maleic anhydride copolymer or α-olefin-maleic anhydride copolymer and half-esterified with a (metha)acrylic compound having hydroxyl group such as hydroxyalkyl(metha) acrylate.

As for the monomers and oligomers which are the precursors of the transparent resin, they include various kinds of acrylic esters and methacrylic esters such as 2-hydroxyethyl (metha)acrylate, 2-hydroxypropyl(metha)acrylate, cyclohexyl(metha)acrylate, polyethyleneglycol di(metha)acrylate, pentaerythritol tri(metha)acrylate, trimethylolpropane (metha)acrylate, dipentaerythritol hexa(metha)acrylate, tricyclodecanyl(metha)acrylate, melamine(metha)acrylate, epoxy(metha)acrylate, etc.; (metha)acrylic acid; styrene; vinyl acetate; (metha)acryl amide; N-hydroxymethyl(metha) acryl amide; acrylonitrile; etc. These compounds can be employed either singly or as a mixture of two or more kinds thereof.

If the color composition is desired to be cured through the irradiation of ultraviolet rays, a photo-polymerization initiator may be added to the color composition.

As for specific examples of the photo-polymerization initiator useful in this case, they include an acetophenone-based photo-polymerization initiator such as 4-phenoxy dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-methyl-1-[4-(methylthio)phenyl]-2-morpholinopropane-1-one, 2-benzyl-2-diamino-1-(4-morpholinophenyl)-butan-1-one; a benzoin-based photo-polymerization initiator such as benzoin, benzoin methyl ether, benzoin ethyl ether, benzoin isopropyl ether, benzyldimethyl ketal, etc.; a benzophenone-based photo-polymerization initiator such as benzophenone, benzoylbenzoic acid, benzoylmethyl benzoate, 4-phenyl benzophenone, hydroxybenzophenone, acrylated benzophenone, 4-benzoyl-4'-methyldiphenyl sulfide, etc.; a thioxanthone-based photo-polymerization initiator such as thioxanthone, 2-chlorothioxanthone, 2-methylthioxanthone, isopropylthioxanthone, 2,4-diisopropylthioxanthone, etc.; a triazine-based photo-polymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis (trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-trichloromethyl-(piperonyl)-6-triazine, 2,4-trichloromethyl(4'-methoxystyryl)-6-triazine, etc.; a borate-based photo-polymerization initiator; a carbazole-based photo-polymerization initiator; an imidazole-based photo-polymerization initiator; etc.

These photo-polymerization initiators can be employed at a ratio ranging from 5 to 200 parts by weight, more preferably 10 to 150 parts by weight based on 100 parts by weight of the pigments in the color composition.

The aforementioned photo-polymerization initiators can be employed either singly or as a mixture of two or more kinds thereof. Further, these photo-polymerization initiators can be employed in combination with a sensitizer, examples of which including α-acyloxy ester, acylphosphine oxide, methylphenyl glyoxylate, benzyl, 9,10-phenanthrene quinone, camphor quinine, ethylanthraquinone, 4,4'-diethyl isophthalophenone, 3,3',4,4'-tetra(t-butyl peroxycarbonyl)benzophenone, etc.

These sensitizers can be employed at a ratio ranging from 0.1 to 60 parts by weight based on 100 parts by weight of the photo-polymerization initiator.

The color composition may further comprise a polyfunctional thiol which is capable of acting as a chain-transfer agent.

As for this chain-transfer agent, it is possible to employ a compound having two or more thiol groups. Specific examples of such a compound include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc. These polyfunctional thiols can be employed singly or in combination of two or more kinds.

The mixing ratio of these polyfunctional thiols may preferably be confined within the range of 0.2 to 150 parts by weight, more preferably 0.2 to 100 parts by weight based on 100 parts by weight of the pigments in the color composition.

The color composition to be employed for forming the color pixel of color filter according to one embodiment of the present invention may further contain a solvent for enabling the pigments to be sufficiently dispersed in the pigment carrier and for enabling the color composition to be coated on the surface of a transparent substrate such as a glass substrate, thereby making it possible to easily create a layer of filter segment having a hardened film thickness of 0.2-5 μm. Specific examples of such a solvent include, for example, cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n amyl ketone, propyleneglycol monomethyl ether, toluene, methylethyl ketone, ethyl acetate, methanol, ethanol, isopropyl alcohol, butanol, isobutyl ketone, petroleum solvent, etc. These solvents may be employed singly or in combination of two or more kinds.

The mixing ratio of these solvents may preferably be confined within the range of 800 to 4000 parts by weight, more preferably 1000 to 2500 parts by weight based on 100 parts by weight of the pigments in the color composition.

The color composition can be manufactured by finely dispersing one or more kinds of pigments, if required, together with the aforementioned photo-polymerization initiator in a pigment carrier as well as in an organic solvent. As for the means for carrying out the dispersion in this case, it is possible to employ a triple roll mill, a twin-roll mill, a sand mill, a kneader, an atomizer, etc. Further, in the case of a color composition containing two or more kinds of pigments, each of the pigments may be separately finely dispersed in a pigment carrier as well as in an organic solvent to obtain a dispersion, which is then mixed with other dispersion(s) prepared in the same manner as described above.

On the occasion of dispersing pigments in a pigment carrier as well as in an organic solvent, a dispersing agent such as a resin type pigment dispersing agent, a surfactant, a pigment derivative, etc., can be optionally employed. Since this dispersing agent is excellent in enhancing the dispersibility of pigments and in its effects to prevent the re-flocculation of pigments after the dispersion thereof, the employment of a color composition wherein the pigments are dispersed in a pigment carrier and in an organic solvent by making use of this dispersing agent is advantageous in obtaining a color filter with color pixels excellent in transparency.

The mixing ratio of the dispersing agent may preferably be confined within the range of 0.1 to 40 parts by weight, more preferably 0.1 to 30 parts by weight based on 100 parts by weight of the pigments in the color composition.

The resin type pigment dispersing agent is formed of a compound having not only a pigment affinity moiety exhibiting pigment-adsorbing properties, but also another moiety exhibiting compatibility to a pigment carrier, thereby enabling the dispersing agent to adsorb onto the pigment and to stabilize the dispersion of the pigment in the pigment carrier. As for specific examples of the resin type pigment dispersing agent, they include polyurethane, polycarboxylate such as polyacrylate, unsaturated polyamide, polycarboxylic acid, (partial) amine polycarboxylate, ammonium polycarboxylate, alkyl amine polycarboxylate, polysiloxane, long chain polyaminoamide phosphate, hydroxyl group-containing polycarboxylate and modified compounds thereof, an oily dispersing agent such as amide to be formed through a reaction between poly(lower alkyl imine) and polyester having a free carboxyl group and salts of the amide, (metha)acrylic acid-styrene copolymer, (metha)acrylic acid-(metha)acrylate copolymer, styrene-maleic acid copolymer, polyvinyl alcohol, water-soluble resin or water-soluble macromolecular compound such as poly(vinyl pyrrolidone), polyester compounds, modified polyacrylate compounds, ethylene oxide/propylene oxide adduct, phosphate, etc. These compounds may be employed individually or in combination of two or more kinds.

As for this surfactant, it is possible to employ an anionic surfactant such as polyoxyethylene alkylether sulfate, dodecylbenzene sodium sulfonate, alkali salts of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer, polyoxyethylene alkylether phosphate, etc.; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate, polyethyleneglycol monolaurate, etc.; cationic surfactant such as alkyl quaternary ammonium salt and an ethylene oxide adduct thereof, etc.; and an amphoteric surfactant such as alkyl betaine such as betaine alkyldimethyl aminoacetate, alkylimidazoline, etc. These surfactants can be employed singly or in combination of two or more kinds.

The pigment derivatives to be used on the occasion of salt milling or acid pasting are formed of a compound comprising an organic pigment having a substituent group introduced therein and may preferably be selected from those whose hue is close to the hue of the pigment to be used. However, when the mixing ratio of pigment derivatives is relatively small, they may be selected from those whose hue differs from the hue of the pigment to be used. The organic pigment herein includes aromatic polycyclic compounds exhibiting light yellow color such as naphthalene-based compounds, anthraquinone-based compounds which are not called pigment in general. As for specific examples of the pigment derivatives, it is possible to employ those described in JP-A 63-305173 (KOKAI), JP Patent Publication 57-15620, JP Patent Publication 59-40172, JP Patent Publication 63-17102 and JP Patent Publication 5 (1993)-9469. Especially, since pigment derivatives having a basic group are highly effective in the dispersion of pigment, they can be preferably employed. These pigment derivatives may be employed singly or in combination of two or more kinds.

The color composition may further contain a storage stabilizing agent for stabilizing the age viscosity of the composition. As for specific examples of the storage stabilizing agent, they include, for example, quaternary ammonium chlorides such as benzyltrimethyl chloride, diethylhydroxy amine, etc.; organic acids such as lactic acid, oxalic acid, etc., and methyl ethers thereof; t-butyl pyrocatechol; organic phosphine such as tetraethyl phosphine, tetraphenyl phosphine, etc.; phosphite; etc.

The storage stabilizing agent can be employed at a ratio of 0.1-10 parts by weight based on 100 parts by weight of the pigment in a color composition.

The color composition may further contain an adherence improver such as a silane coupling agent for the purpose of enhancing the adhesion to a substrate.

As for specific examples of the silane coupling agent, they include vinyl silanes such as vinyl tris(β-methoxyethoxy) silane, vinylethoxy silane, vinyltrimethoxy silane, etc.; (metha)acrylsilanes such as γ-methacryloxypropyl silane, etc.; epoxy silanes such as β-(3,4-epoxycyclohexyl)ethyltrimethoxy silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyl trimethoxy silane, γ-glycidoxypropyl triethoxy silane, etc.; amino silanes such as N-β(aminoethyl) γ-aminopropyl trimethoxy silane, N-β(aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane, N-phenyl-γ-aminopropyl triethoxy silane, etc.; and thiosilanes such as γ-mercaptopropyl trimethoxy silane, γ-mercaptopropyl triethoxy silane, etc.

These silane coupling agents can be employed at a ratio of 0.01-100 parts by weight based on 100 parts by weight of the pigment in a color composition.

The color composition can be formulated as a gravure offset printing ink, a waterless offset printing ink, a silk screen printing ink, or a solvent developing type or alkaline developing type color resist. The color resist is formulated such that pigment(s) is dispersed in a composition comprising a thermoplastic resin, thermosetting resin or photosensitive resin, a monomer, a photo-polymerization initiator and an organic solvent.

The pigment may preferably be incorporated at a ratio of 5-70% by weight based on the quantity (100% by weight) of solid matters of the color composition. More preferably, the pigment may be incorporated at a ratio of 20-50% by weight, the balance being substantially constituted by a resinous binder that can be provided by a pigment carrier.

The color composition may preferably be formulated such that bulky particles 5 μm or more in size, preferably, bulky particles 1 μm or more in size, more preferably, bulky particles 0.5 μm or more in size as well as dusts intermingled therein are completely removed from the composition by making use of any suitable means such as centrifugal separation, sintered filter, membrane filter, etc.

The color filter according to the first aspect of the present invention is provided, on a transparent substrate, with a red filter segment, a green filter segment and a blue filter segment, all of which can be formed by means of printing method or photolithography method using each of the aforementioned color compositions.

As for the transparent substrate, it is possible to employ a glass plate made of a material such as a soda-lime glass, low alkali borosilicate glass, alkaliless amino borosilicate glass, etc.; and a resin plate made of a material such as polycarbonate, poly(methyl methacrylate), polyethylene terephthalate, etc. For the purpose of driving the liquid crystal after the fabrication of a liquid crystal panel, a transparent electrode consisting of indium oxide or tin oxide may be formed on the surface of these glass plate or resin plate.

Since the patterning of these color segments by means of printing method can be performed by simply repeating the printing and drying of a color composition that has been prepared as various kinds of printing inks, the printing method is advantageous as a manufacturing method of color filter in terms of manufacturing cost and mass production. Further, due to the recent development of printing technique, it is now possible to perform the printing of very fine pattern which is excellent in dimensional precision as well as in smoothness. In order to perform the printing, the ink may preferably be formulated such that it cannot be dried or solidified on the surface of printing plate or of blanket. Furthermore, it is also important to control the fluidity of ink on the surface of printing machine, so that it may be advisable to adjust the viscosity of ink by making use of a dispersant or an extender pigment.

When each of color filter segments is to be formed by means of photolithography method, a color composition which has been formulated as a solvent developing type or alkaline developing type color resist is coated on the surface of transparent substrate by any desired method of coating such as spray coating, spin coating, slit coating, roll coating, etc., thereby forming a layer having a thickness (as dried) of 0.2-10 μm. On the occasion of drying the coated layer, it may be performed by making use of a vacuum dryer, convection oven, an IR oven, a hot plate, etc.

The layer thus dried as required is then subjected to the exposure to ultraviolet ray through a mask having a predetermined pattern and disposed in contact with this layer or in non-contact with this layer. Subsequently, the resultant layer is dipped in a solvent or an alkaline developing solution or sprayed with a developing solution by means of spraying machine, thereby removing the uncured portion to obtain a desired pattern. Thereafter, the same procedures are repeated for other colors, thus manufacturing a color filter. Further, for the purpose of promoting the polymerization of the color resist, heating may be applied to the coated resist. According to this photolithography method, it is possible to manufacture a color filter which is more excellent in precision as compared with that can be obtained from the aforementioned printing methods.

On the occasion of performing the development, an aqueous solution such as sodium carbonate, sodium hydroxide, etc., can be employed as an alkaline developing solution. It is also possible on this occasion to employ an organic alkali such as dimethylbenzyl amine, triethanol amine, etc. Further, the developing solution may contain a defoaming agent or a surfactant. As for the method of developing treatment, it is possible to employ a shower developing method, a spray developing method, a dip developing method, a paddle developing method, etc.

Incidentally, in order to enhance the sensitivity to ultraviolet exposure, a water-soluble or alkali-soluble resin such, for example, as polyvinyl alcohol or a water-soluble acrylic resin may be coated on the color resist that has been coated and dried in advance, thereby forming a film which is capable of minimizing the effects of oxygen to obstruct the polymerization. Thereafter, the color resist is subjected to ultraviolet exposure.

The color filter according to the first aspect of the present invention can be manufactured by means of an electrodeposition method or a transferring method other than the aforementioned methods. The electrodeposition method is a method which is featured in that, by taking advantage of a transparent conductive film formed on the surface of a transparent substrate, each of the color filter segments is electrodeposited on the transparent conductive film through the effects of electrophoresis of colloidal particles, thereby manufacturing the color filter. On the other hand, the transferring method is a method which is featured in that a color filter layer is formed in advance on the surface of a releasable transferring base sheet and then this color filter layer is transferred onto a desired transparent substrate.

Next, a liquid crystal display device according to the second aspect of the present invention equipped with the color filter according to the first aspect of the present invention will be explained as follows.

Figure 2:
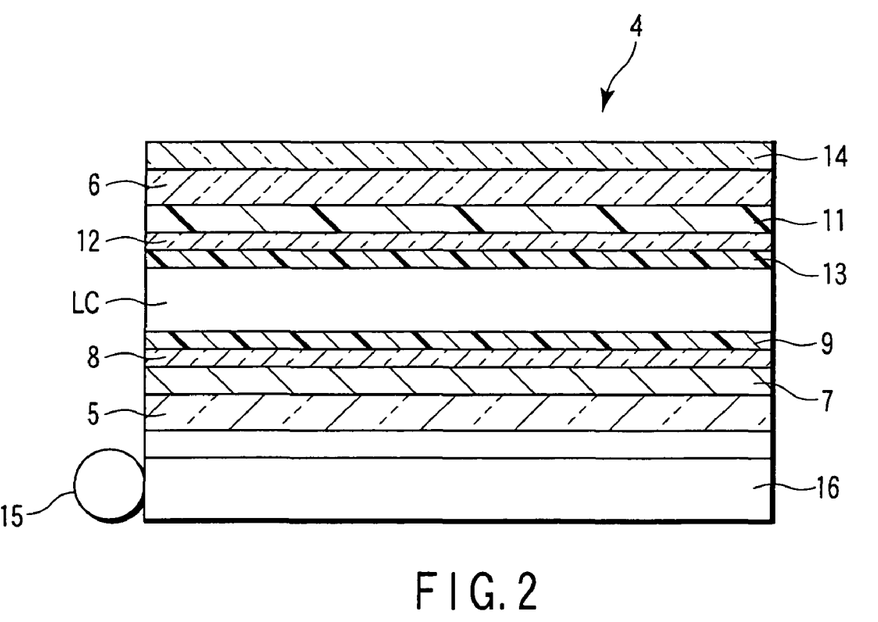
FIG. 2 is a cross-sectional view schematically illustrating one example of the liquid crystal display device according to a second aspect of the present invention.

FIG. 2 is a cross-sectional view schematically illustrating the liquid crystal display device according to a second aspect of the present invention. The liquid crystal display device 4 shown in FIG. 2 illustrates a typical example of a TFT drive type liquid crystal display device for use in a notebook-sized personal computer. This liquid crystal display device 4 is provided with a pair of a first transparent substrate 5 and a second transparent substrate 6, which are arranged face to face with a gap interposed therebetween. The gap is filled with a liquid crystal (LC). This LC is aligned depending on the kind of driving mode such as twisted nematic (TN), super twisted nematic (STN), in-plane switching (IPS), vertical alignment (VA), optically compensated birefringence (OCB), etc.

On the inner wall of the first transparent substrate 5, there is formed a thin-film transistor (TFT) array 7. On this TFT array 7 is deposited a transparent electrode layer 8 formed of ITO for example. On this transparent electrode layer 8 is further provided an alignment layer 9. Further, a polarizer 10 is formed on the outer surface of the transparent substrate 5.

On the other hand, on the inner wall of the second transparent substrate 6, there is formed a color filter 11 according to the first aspect of the present invention. The red, green and blue filter segments constituting the color filter 11 are separated from each other by a black matrix (not shown). If required, a transparent protective film (not shown) may be formed so as to cover the color filter 11. Furthermore, a transparent electrode layer 12 formed of ITO for example is formed on this protective film. An alignment layer 13 is deposited so as to cover the transparent electrode layer 12. Further, a polarizer 14 is formed on the outer surface of the transparent substrate 6. Incidentally, a backlight unit 16 equipped with a triple wavelength lamp 15 is disposed below the polarizer 10.

According to this embodiment, red, green and blue pixels are respectively formed by making use of a color composition which is harmonized in color through a combination of several kinds of pigments differing in color so as to conform with the backlight and with the characteristics of liquid crystal of LCD. In this case, the values of perpendicular optical retardation $R_{Rth}$, $G_{Rth}$ and $B_{Rth}$ of each color pixel are controlled so as to satisfy the following formulas (1 and 2). As a result, it is possible to prevent the generation of non-uniformity of the polarized state of light passing through the display region of each color pixel, thus making it possible to obtain a liquid display device which is excellent in oblique viewing angle display. Further, since the display in dark state of black mode is compensated in oblique viewing angle, it is possible to reproduce black color which is minimized in color shifting and excellent in neutral, thus exhibiting highly excellent display characteristics:

$$|(R_{Rth}-B_{Rth})|-|(G_{Rth}-B_{Rth})| \geq 0 \qquad (1)$$

$$|(R_{Rth}-B_{Rth})|-|(R_{Rth}-G_{Rth})| \geq 0 \qquad (2)$$

wherein $R_{Rth}$, $G_{Rth}$ and $B_{Rth}$ represent, respectively, a product of the thickness [nm] of a pixel and a value obtained by subtracting a value of thickness-wise refractive index from an average value of the in-plane refractive index of each of these pixels.

EXAMPLES

Next, the present invention will be explained in detail with reference to specific examples and comparative examples, which are not intended to limit the scope of the present invention.

(Preparation of Pigments)

Pigments to be employed in Examples and Comparative Examples were prepared according to the following method. Then, the primary particle diameter d50 of pigments thus obtained was calculated by taking the pictures of the pigments in the view by making use of a transmission electron microscope JEM-2010 (manufactured by Japan Electron Co., Ltd.) and by performing the image analysis of the pictures. The primary particle diameter d50 herein represents a particle diameter (a diameter of equivalent circle) which corresponds to a particle diameter as measured where an integrated quantity in the cumulative curve of number particle size distribution is 50% of the total quantity. The cumulative curve of number particle size distribution is obtained by plotting the mean value of the major axis and minor axis of 100 primary particles of each pigment, constituting the aggregate on the two-dimensional image, with respect to the number of the particles. The results are shown in the following Table 1.

TABLE 1

| Colors | Symbols | Primary particle diameter (nm) |
|---|---|---|
| Red | R-1 | 54.2 |
|  | R-2 | 24.8 |
|  | R-3 | 58.5 |
|  | R-4 | 28.1 |
| Green | G-1 | 38.4 |
|  | G-2 | 26.5 |
|  | G-3 | 22.4 |
| Yellow | Y-1 | 99.5 |
|  | Y-2 | 21.2 |
| Blue | B-1 | 43.9 |
|  | B-2 | 28.3 |
| Violet | V-1 | 43.6 |
|  | V-2 | 26.4 |

Example 1

{Red Pigment 2 (R-2)}

160 parts (based on weight, the same hereinafter) of red pigment 1 (C.I. Pigment Red 254; Chiba Speciality Chemicals Co., Ltd. "IRGAPHOR RED B-CF"; R-1), 1600 parts of sodium chloride, and 190 parts of diethylene glycol (Tokyo Kasei Co., Ltd.) were put into a 1 gallon stainless steel kneader (Inoue Seisakusho Co., Ltd.) and kneaded for 8 hours at a temperature of 60° C. Then, the resultant mixture was introduced into hot water approximately 5 liters in volume and stirred for about one hour by means of a high-speed mixer while heating it at a temperature of about 70° C. to obtain a slurry product. This slurry product was then subjected to filtration and washing with water to remove sodium chloride and diethylene glycol and dried for 24 hours at a temperature of 80° C. to obtain 156 parts of a salt milling-treated pigment (Red pigment 2).

{Red Pigment 4 (R-4)}

160 parts of red pigment 3 (C.I. Pigment Red 177; Chiba Speciality Chemicals Co., Ltd. "CROMOPHTAL RED A2B"; R-3), 1600 parts of sodium chloride, and 190 parts of diethylene glycol (Tokyo Kasei Co., Ltd.) were put into a 1 gallon stainless steel kneader (Inoue Seisakusho Co., Ltd.) and kneaded for 12 hours at a temperature of 60° C.

Then, the resultant mixture was introduced into hot water approximately 5 liters in volume and stirred for about one hour by means of a high-speed mixer while heating it at a temperature of about 70° C. to obtain a slurry product. This slurry product was then subjected to filtration and washing with water to remove sodium chloride and diethylene glycol and dried for 24 hours at a temperature of 80° C. to obtain 156 parts of a salt milling-treated pigment (Red pigment 4).

{Green Pigment 2 (G-2)}

200 parts of green pigment 1, 1500 parts of sodium chloride, and 270 parts of diethylene glycol (Tokyo Kasei Co., Ltd.) were put into a 1 gallon stainless steel kneader (Inoue Seisakusho Co., Ltd.) and kneaded for 8 hours at a temperature of 70° C.

Then, the resultant mixture was introduced into hot water approximately 5 liters in volume and stirred for about one hour by means of a high-speed mixer while heating it at a temperature of about 70° C. to obtain a slurry product. This slurry product was then subjected to filtration and washing with water to remove sodium chloride and diethylene glycol and dried for 24 hours at a temperature of 80° C. to obtain 197 parts of a salt milling-treated pigment (Green pigment 2).

{Green Pigment 3 (G-3)}

120 parts of green pigment 1, 1600 parts of sodium chloride, and 270 parts of diethylene glycol (Tokyo Kasei Co., Ltd.) were put into a 1 gallon stainless steel kneader (Inoue Seisakusho Co., Ltd.) and kneaded for 12 hours at a temperature of 70° C.

Then, the resultant mixture was introduced into hot water approximately 5 liters in volume and stirred for about one hour by means of a high-speed mixer while heating it at a temperature of about 70° C. to obtain a slurry product. This slurry product was then subjected to filtration and washing with water to remove sodium chloride and diethylene glycol and dried for 24 hours at a temperature of 80° C. to obtain 117 parts of a salt milling-treated pigment (Green pigment 3).

{Yellow Pigment 1 (Y-1)}

"FANCHON FAST YELLOW Y-5688" available from BAYER (C.I. Pigment Yellow 150; Y-1) was used as Yellow pigment 1.

{Yellow Pigment 2 (Y-2)}

160 parts of yellow pigment (C.I. Pigment Yellow 138; "PALIOTOL YELLOW K0961HD" available from BAYER), 1600 parts of sodium chloride, and 270 parts of diethylene glycol (Tokyo Kasei Co., Ltd.) were put into a 1 gallon stainless steel kneader (Inoue Seisakusho Co., Ltd.) and kneaded for 15 hours at a temperature of 60° C.

Then, the resultant mixture was introduced into hot water approximately 5 liters in volume and stirred for about one hour by means of a high-speed mixer while heating it at a temperature of about 70° C. to obtain a slurry product. This slurry product was then subjected to filtration and washing with water to remove sodium chloride and diethylene glycol and dried for 24 hours at a temperature of 80° C. to obtain 157 parts of a salt milling-treated pigment (Yellow pigment 2).

{Blue Pigment 2 (B-2)}

200 parts of blue pigment 1 (C.I. Pigment Blue 15:6; "LIONOL BLUE ES"; B-1 available from Toyo Ink Manufacturing Co., Ltd.), 1600 parts of sodium chloride, and 100 parts of diethylene glycol (Tokyo Kasei Co., Ltd.) were put into a 1 gallon stainless steel kneader (Inoue Seisakusho Co., Ltd.) and kneaded for 12 hours at a temperature of 70° C.

Then, the resultant mixture was introduced into hot water approximately 5 liters in volume and stirred for about one hour by means of a high-speed mixer while heating it at a temperature of about 70° C. to obtain a slurry product. This slurry product was then subjected to filtration and washing with water to remove sodium chloride and diethylene glycol and dried for 24 hours at a temperature of 80° C. to obtain 198 parts of a salt milling-treated pigment (Blue pigment 2).

{Violet Pigment 2 (V-2)}

300 parts of violet pigment 1 (C.I. Pigment Violet 23; "LIONOGEN VIOLET RL"; V-1 available from Toyo Ink Manufacturing Co., Ltd.) was introduced into 3000 parts of 96% sulfuric acid and stirred for one hour and the resultant mixture was poured into water of 5° C. The resultant mixture was stirred for one hour and then subjected to filtration and washing with hot water until the cleaning liquid became neutral. The product thus obtained was dried at a temperature of 70° C., thus obtaining an acid pasting-treated pigment. 120 parts of this acid pasting-treated pigment, 1600 parts of sodium chloride, and 100 parts of diethylene glycol (Tokyo Kasei Co., Ltd.) were put into a 1 gallon stainless steel kneader (Inoue Seisakusho Co., Ltd.) and kneaded for 18 hours at a temperature of 90° C.

Then, the resultant mixture was introduced into hot water approximately 5 liters in volume and stirred for about one hour by means of a high-speed mixer while heating it at a temperature of about 70° C. to obtain a slurry product. This slurry product was then subjected to filtration and washing with water to remove sodium chloride and diethylene glycol and dried for 24 hours at a temperature of 80° C. to obtain 118 parts of a salt milling-treated pigment (Violet pigment 2).

(Preparation of Acrylic Resin Solution)

The solution of acrylic resin to be employed in Examples and Comparative Examples was prepared as follows. The molecular weight of the resin was a weight average molecular weight reduced as polystyrene and measured by means of gel permeation chromatography (GPC).

370 parts of cyclohexanone was put into a reaction vessel and heated at a temperature of 80° C. while introducing nitrogen gas into the reaction vessel and then a mixture comprising the following monomers and, while keeping this temperature, thermal polymerization initiator was added dropwise to the cyclohexanone over one hour, thereby allowing a polymerization reaction to take place.

| | |
|---|---|
| Methacrylic acid | 20.0 parts |
| Methyl methacrylate | 10.0 parts |
| n-butyl methacrylate | 35.0 parts |
| 2-hydroxyethyl methacrylate | 15.0 parts |
| 2,2'-azobis-isobutyronitrile | 4.0 parts |

Paracumylphenol ethylene oxide-modified acrylate (Aronix M110; Toua Gosei Co., Ltd.) 20.0 parts After finishing the addition of the aforementioned mixture, the reaction of this mixture was further allowed to take place for 3 hours at a temperature of 80° C. Thereafter, a solution consisting of 1.0 part of azobis-isobutyronitrile and 50 parts of cyclohexanone was added to the reaction mixture and the reaction thereof was continued for one hour at a temperature of 80° C. to obtain a solution of acrylic acid. The weight average molecular weight of this acrylic acid was about 40,000.

After being cooled down to room temperature, about 2 g of this resin solution was sampled out and thermally dried to measure nonvolatile matter. A suitable amount of cyclohexanone was added to the resin solution that had been synthesized in advance so as to make the ratio of the nonvolatile matter become 20% by weight, thus preparing a solution of acrylic resin.

(Preparation of Pigment Dispersion)

A mixture having a composition (weight ratio) shown in the following Table 2 was homogeneously stirred and then, by making use of zirconia beads having a diameter of 0.5 mm, the dispersion of the components of the composition was performed for 2 hours by means of Eigar mill and the resultant product was subjected to filtration by making use of a 5-μm filter to obtain a pigment dispersion.

TABLE 2

| Pigment dispersion | | RP-1 | RP-2 | RP-3 | GP-1 | GP-2 | GP-3 | BP-1 |
|---|---|---|---|---|---|---|---|---|
| Pigments | 1st pigment | — | R-1 | — | G-2 | G-3 | G-2 | B-2 |
| | 2nd pigment | R-2 | R-2 | R-2 | Y-1 | Y-2 | Y-2 | V-2 |
| | 3rd pigment | R-3 | R-4 | R-4 | — | — | — | — |
| Composition | 1st pigment | 0.0 | 2.9 | 0.0 | 8.3 | 8.3 | 7.9 | 9.6 |
| | 2nd pigment | 9.6 | 6.7 | 1.1 | 5.4 | 5.4 | 5.8 | 0.4 |
| | 3rd pigment | 1.1 | 1.1 | 9.6 | 0.0 | 0.0 | 0.0 | 0.0 |
| | Dispersing agent | 1.3 | 1.3 | 1.3 | 1.8 | 1.8 | 1.8 | 2.0 |
| | Acrylic resin solution | 40.0 | 40.0 | 40.0 | 36.5 | 36.5 | 36.5 | 40.0 |
| | Organic solvent | 48.0 | 48.0 | 48.0 | 48.0 | 48.0 | 48.0 | 48.0 |
| | Total | 100.0 | 100.0 | 100.0 | 100.0 | 100.0 | 100.0 | 100.0 |

(Preparation of Color Composition (Hereinafter Referred to as Resist))

A mixture having a composition (weight ratio) shown in the following Table 3 was homogeneously stirred and then subjected to filtration by making use of a 1-μm filter, thereby obtaining resists of various colors.

TABLE 3

| | Resist | RR-1 | RR-2 | RR-3 | GR-1 | GR-2 | GR-3 | BR-1 |
|---|---|---|---|---|---|---|---|---|
| | Pigment dispersion | RP-1 | RP-2 | RP-3 | GP-1 | GP-2 | GP-3 | BP-1 |
| Composition | Pigment dispersion | 51.0 | 51.0 | 51.0 | 52.0 | 52.0 | 52.0 | 42.0 |
| | Acrylic resin solution | 1.0 | 1.0 | 1.0 | 0.0 | 0.0 | 0.0 | 10.0 |
| | Monomer | 4.0 | 4.0 | 4.0 | 4.8 | 4.8 | 4.8 | 5.6 |
| | Photo-polymerization initiator | 3.4 | 3.4 | 3.4 | 2.8 | 2.8 | 2.8 | 2.0 |
| | Sensitizing agent | 0.4 | 0.4 | 0.4 | 0.2 | 0.2 | 0.2 | 0.2 |
| | Organic solvent | 40.2 | 40.2 | 40.2 | 40.2 | 40.2 | 40.2 | 40.2 |
| | Total | 100.0 | 100.0 | 100.0 | 100.0 | 100.0 | 100.0 | 100.0 |

Monomer: trimethyrolpropane triacrylate (NK Ester ATMPT; Shin-Nakamura Kagaku Co., Ltd.)

Photopolymerization-initiator: 2-methyl-1-[4-(methylthio)phenyl]-2-morphorinopropane-1-one (Irgar Cure 907; Ciba-Geigy Co., Ltd.)

Sensitizer: 4,4'-bis(diethylamino)benzophenone (EAB-F; Hodogaya Chemicals Co.)

Organic solvent: cyclohexanone

Examples 1 and 2; Comparative Examples 1 and 2

The resists of various colors shown in above Table 3 were used in combination for manufacturing color filters by making use of the following method.

(Preparation of Color Filters)

First of all, by means of spin coating, a red resist was coated on the surface of a glass substrate having a black matrix formed thereon in advance and then pre-baked for 20 minutes in a clean oven at a temperature of 70° C. Then, after being cooled to room temperature, the substrate was exposed, through a photomask, to ultraviolet rays by making use of an ultra-high pressure mercury lamp. Thereafter, the resultant substrate was subjected to spray development by making use of an aqueous solution of sodium carbonate heated up to 23° C., after which the resultant substrate was washed with ion-exchange water and air-dried. Further, the resultant substrate was post-baked for 30 minutes in a clean oven at a temperature of 230° C., thereby forming a red filter segment having stripe-like configuration on the substrate.

Next, by making use of a green resist, the green filter segment was coated on the surface of substrate in the same manner as described above and, further, by making use of a blue resist, the blue filter segment was coated on the surface of substrate in the same manner as described above, thereby obtaining a color filter. The film thickness of each of these color filter segments was 2.0 μm in every case.

(Preparation of Each of Color Coat Films and Measurement of Chromaticity Thereof)

By means of spin coating, each color resist was coated on the surface of a glass substrate and then pre-baked for 20 minutes in a clean oven at a temperature of 70° C. Then, after being cooled to room temperature, the substrate was exposed to ultraviolet rays by making use of an ultra-high pressure mercury lamp. Thereafter, the resultant substrate was subjected to spray development by making use of an aqueous solution of sodium carbonate heated up to 23° C., after which the resultant substrate was washed with ion-exchange water and air-dried. Further, the resultant substrate was post-baked for 30 minutes in a clean oven at a temperature of 230° C., thereby forming a dried film for use in the measurement of the chromaticity and film thickness of each of color coat films. The film thickness of each of these dried films was 2.0 μm in every case. The chromaticity in a chromaticity diagram for XYZ color specification system was measured by making use of a spectrophotometer ("OSP-200"; Olympus Co., Ltd.). The results are shown in the following Table 4.

(Measurement of $R_{Rth}$, $G_{Rth}$ and $B_{Rth}$ of Each Color Coat Film)

The values of perpendicular optical retardation $R_{Rth}$, $G_{Rth}$ and $B_{Rth}$ of each color coat film thus obtained were determined as follows. Namely, by making use of a spectroellipsometer (M-220 (trade name); Nippon Bunko Co., Ltd.), three-dimensional refractive indexes of nx, ny and nz were measured at first and then a product to be derived from the multiplication between a value obtained by subtracting a value of thickness-wise refractive index [nz] from an average value [(nx+ny)/2] of the in-plane refractive index of a pixel and the thickness (μm) of a pixel is multiplied by a factor of 1000, thus obtaining the values of perpendicular optical retardation. The results thus obtained are shown in the following Table 4.

By making use of the color filter thus obtained, a liquid crystal display device was manufactured according to the following method.

(Manufacture of a Liquid Crystal Display Device)

A transparent ITO electrode layer was formed on the color filter obtained as described above and then a polyimide alignment layer was formed on the ITO electrode layer. Further, a polarizer with phase compensation capacity was formed on the opposite surface of the glass substrate. On the other hand, a TFT array and pixel electrodes were formed on one surface of another glass substrate and a polarizer with phase compensation capacity was formed on the opposite surface of this glass substrate.

A couple of glass substrates thus prepared were positioned face to face so as to make the electrode layers thereof face to each other. Then, these glass substrates were aligned with each other while securing a predetermined gap between these substrates by making use of spacer beads and then the outer circumference of this composite body of substrates was entirely sealed while leaving an opening for injecting a liquid crystal composition. Thereafter, a liquid crystal composition was injected, via the opening, into the gap and then the opening was closed. The liquid crystal display device thus manufactured was assembled with a backlight unit to obtain a liquid crystal panel of homeotropic alignment.

As for the polarizer with phase compensation capacity to be disposed on the opposite surfaces of this liquid crystal panel, it is possible to employ any known polarizer as long as the phase compensation capacity of polarizer is set so as to conform with the wavelength dispersibility of retardation of liquid crystal layer to be obtained, wherein the wavelength dispersibility of retardation of liquid crystal layer is determined by measuring the retardation at the wavelength of color filter for each liquid crystal layer corresponding to each color region of the color filter.

Incidentally, the optical retardation compensation capacity of the polarizer with phase compensation capacity herein means a total of the optical retardation compensation capacities if the phase compensation layer is consisted of a plurality of films. For example, in the case of the ordinary VA mode, although a single positive A plate and a single negative C plate are employed for constituting the phase compensation layer, a total of the phase compensation capacities of these plates is set in this embodiment. Further, the optical retardation compensation capacity of the polarizer with phase compensation capacity that can be determined as described above is enabled to exhibit such a wavelength dispersibility that it increases continuously or it decrease continuously with respect to the visible wavelength region of 380 to 780 nm.

(Color Filter and Measurement of Contrast of Each Color Coat Film)

Figure 3A:
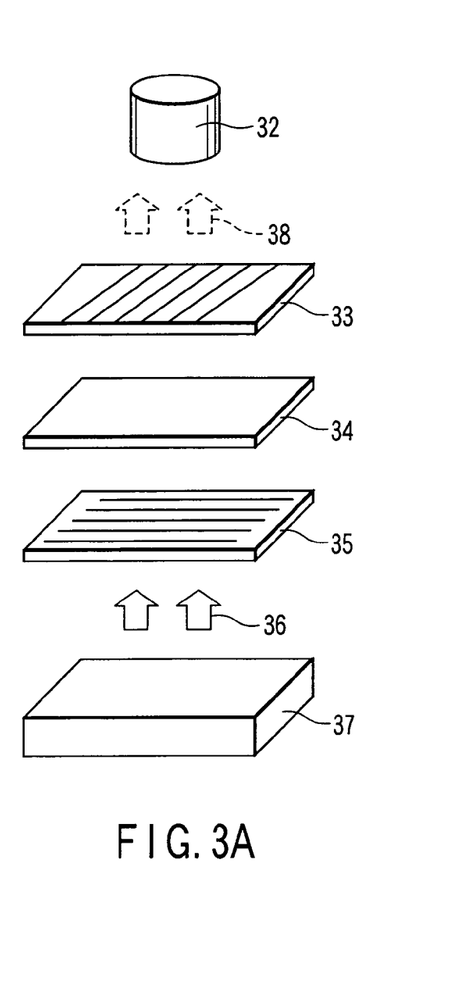
FIG. 3A is an exploded diagram illustrating the arrangement of color filter to be employed for measuring the contrast of each of color coat films, wherein the color filter is disposed in a state of crossed Nicols between a pair of polarizers.

As shown in FIG. 3(a), a color filter 34 which was obtained as described above was interposed between a pair of polarizers 33 and 35 which were arranged in a state of crossed Nicols (the axes of polarization were disposed orthogonally to each other). Then, backlight 37 was irradiated from one polarizer 35 side and the cross brightness (brightness of orthogonally permeated light) of the light 38 that passed through the other polarizer 33 was measured under the condition of 2° viewing angle by making use of a color luminance meter ("BM-5A"; Topcon Co., Ltd.) 32.

Figure 3B:
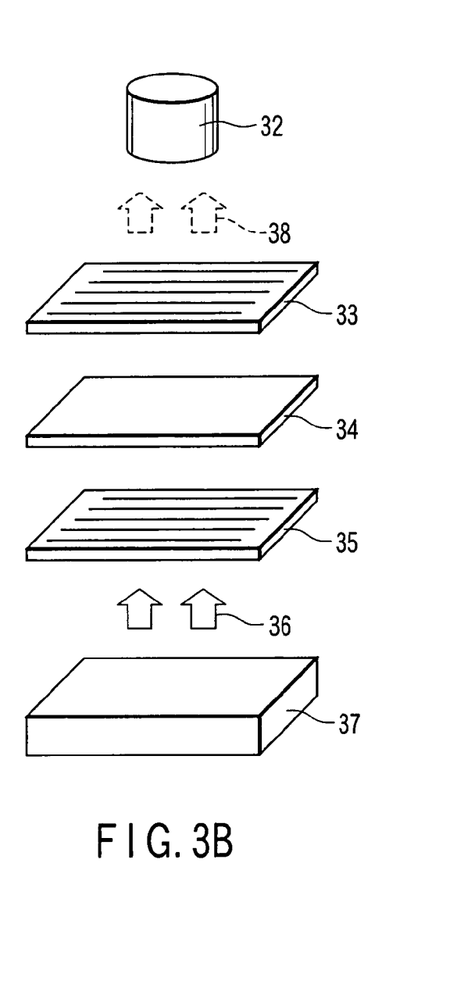
FIG. 3B is an exploded diagram illustrating the arrangement of color filter to be employed for measuring the contrast of each of color coat films, wherein the color filter is disposed in a state of parallel Nicols between a pair of polarizers.

Then, the color filter 34 thus obtained was interposed between a pair of polarizers 33 and 35 which were arranged in a state of parallel Nicols (the axes of polarization were disposed parallel to each other) as shown in FIG. 3(b). Then, backlight 37 was irradiated from one polarizer 35 side and the parallel brightness of the light 38 that passed through the other polarizer 33 was measured by making use of a color luminance meter 32. Then, from the brightness thus obtained, the contrast of parallel brightness/cross brightness was calculated.

Incidentally, the backlight employed herein was featured in that the brightness was 1937 cd/m$^2$; the chromaticity coordinates (x, y) in the chromaticity diagram for XYZ color specification system was (0.316, 0.301); the color temperature was 6525K; and the chromaticity deviation duv was −0.0136. As for the polarizer, "NPF-SEG 1224DU" (Nito Denko Co., Ltd.) was employed.

(Visibility of Liquid Crystal Panel on the Occasion of Displaying Black Color)

The liquid crystal display device manufactured as described above was made to display black color in black mode and the quantity of the light leaked out from the liquid crystal panel (orthogonally permeated light; leaked light) was visually observed. The ranking of assessment was as follows.

◎: Leakage of light was not observed and it was possible to obtain neutral black color, indicating very good visibility.

◯: Leakage of light was observed more or less and it was possible to obtain neutral black color, indicating good visibility.

Δ: Leakage of light was observed and although the black color displayed was slightly tinted, it was considered to raise no problem in practical use.

X: Leakage of light was observed prominently and the black color displayed was remarkably tinted. The visibility was bad.

The results of above measurements are shown in the following Tables 4 and 5.

TABLE 4

| Resist coat film | | RR-1 | RR-2 | RR-3 | GR-1 | GR-2 | GR-3 | BR-1 |
|---|---|---|---|---|---|---|---|---|
| CIE chromaticity | x | 0.652 | 0.649 | 0.649 | 0.279 | 0.278 | 0.278 | 0.136 |
| (C light source) | y | 0.330 | 0.329 | 0.325 | 0.601 | 0.598 | 0.600 | 0.103 |
| | Y | 19.5 | 19.7 | 18.1 | 53.3 | 54.9 | 54.5 | 11.8 |
| Contrast | | 3150 | 1670 | 3320 | 2330 | 2870 | 2390 | 2280 |
| Rth | | 26 | 10 | −10 | 2 | −6 | −21 | −2 |

TABLE 5

| | Resist | | | Contrast | | | Thickness-wise optical retardation | | | Axial visibility in display of black color in liquid crystal panel | Oblique visibility in display of black color in liquid crystal panel |
|---|---|---|---|---|---|---|---|---|---|---|---|
| | Red | Green | Blue | $R_{CR}$ | $G_{CR}$ | $B_{CR}$ | $R_{Rth}$ | $G_{Rth}$ | $B_{Rth}$ | | |
| Ex. 1 | RR-3 | GR-2 | BR-1 | 3320 | 2870 | 2280 | −10 | −6 | −2 | ⊚ | ⊚ |
| Ex. 2 | RR-2 | GR-1 | BR-1 | 1670 | 2330 | 2280 | 10 | 2 | −2 | X | ○ |
| Comp. Ex. 1 | RR-1 | GR-3 | BR-1 | 3150 | 2390 | 2280 | 26 | −21 | −2 | Δ | X |
| Comp. Ex. 2 | RR-3 | GR-1 | BR-1 | 3320 | 2330 | 2280 | −10 | 2 | −2 | ○ | Δ |

It will be recognized from above Tables 4 and 5 that the color filters obtained in Examples 1 and 2 were all excellent in oblique visibility. Whereas, the color filters obtained in Comparative Examples 1 and 2 were all poor in oblique visibility.

Incidentally, in the case of Example 1, since GR-2 whose primary particle diameter d50 was not larger than 40 nm was employed as a green pigment to be contained in the resist GR-2, not only the oblique visibility but also the axial visibility was excellent. Whereas in the case of Example 2, since GR-1 whose primary particle diameter d50 was larger than 40 nm was employed as a green pigment to be contained in the resist GR-1, the axial visibility was inferior.

When the yellow pigment Y-1 to be employed in the resist GR-1 in Example 2 was replaced by a yellow pigment which was refined to 22 nm in particle diameter and the preparation of a color filter was performed in the same manner as in Example 2 in the manufacture of a liquid crystal panel, the leakage of light in the axial display thereof was minimized, thus improving the visibility thereof.

Therefore, if it is desired to obtain excellent results not only in oblique visibility but also in axial visibility, it is required to employ a pigment where the primary particle diameter d50 thereof is not larger than 40 nm.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color filter comprising a substrate, a red pixel, green pixel and blue pixel, each being disposed on the substrate, wherein a perpendicular optical retardation $R_{Rth}$ of the red pixel, a perpendicular optical retardation $G_{Rth}$ of the green pixel, and a perpendicular optical retardation $B_{Rth}$ of the blue pixel range from −10 nm and +10 nm and satisfy the following formulas (1) and (2):

$$|(R_{Rth}-B_{Rth})|-|(G_{Rth}-B_{Rth})| \geqq 0 \quad (1)$$

$$|(R_{Rth}-B_{Rth})|-|(R_{Rth}-G_{Rth})| \geqq 0 \quad (2)$$

wherein $R_{Rth}$, $G_{Rth}$ and $B_{Rth}$ represent, respectively, a product of a thickness [nm] of a pixel and a value obtained by subtracting a value of thickness-wise refractive index from an average value of an in-plane refractive index of each of these pixels.

2. The color filter according to claim 1, wherein a primary particle diameter of pigments contained in the red pixel, the green pixel and the blue pixel is confined to 40 nm or less, wherein the primary particle diameter is a particle diameter of 50% in an integrated quantity in a cumulative curve of number particle size distribution.

3. The color filter according to claim 1, wherein the red pixel contains at least one red pigment selected from the group consisting of diketopyrrolopyrrol-based red pigment and anthraquinone-based red pigment.

4. The color filter according to claim 3, wherein the red pixel contains 0-100% by weight of diketopyrrolopyrrol-based red pigment and 0-66% by weight of the anthraquinone-based red pigment both based on a total weight of the pigments.

5. The color filter according to claim 4, wherein the diketopyrrolopyrrol-based red pigment is formed of C.I. Pigment Red 254 and the anthraquinone-based red pigment is formed of C.I. Pigment Red 177.

6. The color filter according to claim 1, wherein the green pixel contains at least one pigment selected from the group consisting of metallophthalocyanine halide-based green pigment, azo-based yellow pigment and quinophthalone-based yellow pigment.

7. The color filter according to claim 6, wherein the green pixel contains 0-100% by weight of copper phthalocyanine halide-based green pigment and 0-60% by weight of the azo-based yellow pigment and/or quinophthalone-based yellow pigment all based on a total weight of the pigments.

8. The color filter according to claim 7, wherein the copper phthalocyanine halide-based green pigment is formed of C.I. Pigment Green 36, the azo-based yellow pigment is formed of C.I. Pigment Yellow 150 and the quinophthalone-based yellow pigment is formed of C.I. Pigment Yellow 138.

9. The color filter according to claim 1, wherein the blue pixel contains at least one pigment selected from the group consisting of metallophthalocyanine-based blue pigment and dioxazine-based violet pigment.

10. The color filter according to claim 7, wherein the blue pixel contains 0-100% by weight of copper phthalocyanine-based blue pigment and 0-50% by weight of the dioxazine-based violet pigment all based on a total weight of the pigments.

11. The color filter according to claim 10, wherein the copper phthalocyanine-based blue pigment is formed of C.I. Pigment Blue and the dioxazine-based violet pigment is formed of C.I. Pigment Violet 23.

12. A liquid crystal display device which is equipped with the color filter claimed in claim 1.

13. A color filter comprising a substrate, a red pixel, green pixel and blue pixel, each being disposed on the substrate, wherein the red pixel contains at least one red pigment selected from the group consisting of diketopyrrolopyrrol-based red pigment and anthraquinone-based red pigment, the blue pixel contains at least one pigment selected from the group consisting of metallophthalocyanine-based blue pigment and dioxazine-based violet pigment and a perpendicular optical retardation $R_{Rth}$ of the red pixel, a perpendicular optical retardation $G_{Rth}$ of the green pixel, and a perpendicular optical retardation $B_{Rth}$ of the blue pixel range from −10 nm and +10 nm and satisfy the following formulas (1) and (2):

$$|(R_{Rth}-B_{Rth})|-|(G_{Rth}-B_{Rth})| \geqq 0 \quad (1)$$

$$|(R_{Rth}-B_{Rth})|-|(R_{Rth}-G_{Rth})| \geqq 0 \quad (2)$$

wherein $R_{Rth}$, $G_{Rth}$ and $B_{Rth}$ represent, respectively, a product of a thickness [nm] of a pixel and a value obtained by subtracting a value of thickness-wise refractive index from an average value of an in-plane refractive index of each of these pixels.

14. The color filter according to claim 13, wherein a primary particle diameter d50 of pigments contained in the red pixel, the green pixel and the blue pixel is confined to 40 nm or less, wherein the primary particle diameter is a particle diameter of 50% in an integrated quantity in a cumulative curve of number particle size distribution.

15. The color filter according to claim 13, wherein the red pixel contains 0-100% by weight of diketopyrrolopyrrol-based red pigment and 0-66% by weight of the anthraquinone-based red pigment both based on a total weight of the pigments.

16. The color filter according to claim 15, wherein the diketopyrrolopyrrol-based red pigment is formed of C.I. Pigment Red 254 and the anthraquinone-based red pigment is formed of C.I. Pigment Red 177.

17. The color filter according to claim 13, wherein the green pixel contains at least one pigment selected from the group consisting of metallophthalocyanine halide-based green pigment, azo-based yellow pigment and quinophthalone-based yellow pigment.

18. The color filter according to claim 17, wherein the green pixel contains 0-100% by weight of copper phthalocyanine halide-based green pigment and 0-60% by weight of the azo-based yellow pigment and/or quinophthalone-based yellow pigment all based on a total weight of the pigments.

19. The color filter according to claim 18, wherein the copper phthalocyanine halide-based green pigment is formed of C.I. Pigment Green 36, the azo-based yellow pigment is formed of C.I. Pigment Yellow 150 and the quinophthalone-based yellow pigment is formed of C.I. Pigment Yellow 138.

20. The color filter according to claim 18, wherein the blue pixel contains 0-100% by weight of copper phthalocyanine-based blue pigment and 0-50% by weight of the dioxazine-based violet pigment all based on a total weight of the pigments.

21. The color filter according to claim 20, wherein the copper phthalocyanine-based blue pigment is formed of C.I. Pigment Blue and the dioxazine-based violet pigment is formed of C.I. Pigment Violet 23.

22. A liquid crystal display device which is equipped with the color filter claimed in claim 13.

\* \* \* \* \*